United States Patent
Luo et al.

(10) Patent No.: US 11,911,934 B2
(45) Date of Patent: Feb. 27, 2024

(54) METHODS FOR RESHAPING AND BONDING GRAPHENE OXIDE-BASED ARCHITECTURES

(71) Applicant: Northwestern University, Evanston, IL (US)

(72) Inventors: Chong Luo, Evanston, IL (US); Jiaxing Huang, Wilmette, IL (US)

(73) Assignee: Northwestern University, Evanston, IL (US)

( * ) Notice: Subject to any disclaimer, the term of this patent is extended or adjusted under 35 U.S.C. 154(b) by 884 days.

(21) Appl. No.: 16/963,384

(22) PCT Filed: Jan. 25, 2019

(86) PCT No.: PCT/US2019/015071
§ 371 (c)(1),
(2) Date: Jul. 20, 2020

(87) PCT Pub. No.: WO2019/147883
PCT Pub. Date: Aug. 1, 2019

(65) Prior Publication Data
US 2021/0069941 A1     Mar. 11, 2021

Related U.S. Application Data (60) Provisional application No. 62/621,870, filed on Jan. 25, 2018.

(51) Int. Cl.
*B82Y 30/00*     (2011.01)
*B82Y 40/00*     (2011.01)
(Continued)

(52) U.S. Cl.
CPC .......... *B29C 43/184* (2013.01); *B29C 43/003* (2013.01); *C01B 32/158* (2017.08);
(Continued)

(58) Field of Classification Search
CPC ....... B82Y 30/00; B82Y 40/00; C01B 32/158; C01B 32/184; C01B 32/198
See application file for complete search history.

(56) References Cited

U.S. PATENT DOCUMENTS

| | | | |
|---|---|---|---|
| 9,327,985 B2 | 5/2016 | Fugetsu | |
| 2010/0323177 A1* | 12/2010 | Ruoff | B32B 9/04 428/688 |

(Continued)

FOREIGN PATENT DOCUMENTS

| | | |
|---|---|---|
| CN | 105336551 A | 2/2016 |
| CN | 106380865 A | 2/2017 |

(Continued)

OTHER PUBLICATIONS

The International Search Report and the Written Opinion issued for International Application No. PCT/US19/15071 dated Apr. 2, 2019; pp. 1-8.

(Continued)

*Primary Examiner* — Robert B Davis
(74) *Attorney, Agent, or Firm* — Bell & Manning, LLC (57) ABSTRACT

Methods for reshaping graphene oxide sheet-containing structures using water are provided. Graphene oxide sheet-containing structures can be reshaped by applying a force to a graphene oxide sheet-containing structure, wherein the force changes the initial shape of the structure to a new shape. While the force is still acting on the graphene oxide sheet-containing structure, liquid water is applied to the structure to dissipate stress induced by the force and the structure is then dried. When the force is removed, the graphene oxide sheet-containing structure remains fixed in the new shape.

16 Claims, 10 Drawing Sheets

(51) Int. Cl.
*C01B 32/15* (2017.01)
*C01B 32/18* (2017.01)
*C01B 32/19* (2017.01)
*B29C 43/18* (2006.01)
*C01B 32/158* (2017.01)
*C01B 32/194* (2017.01)
*C01B 32/198* (2017.01)
*B29C 43/00* (2006.01)

(52) U.S. Cl.
CPC .......... *C01B 32/194* (2017.08); *C01B 32/198* (2017.08); *B82Y 30/00* (2013.01); *B82Y 40/00* (2013.01)

(56) References Cited

U.S. PATENT DOCUMENTS

2016/0016804 A1* 1/2016 Li .................... C01B 32/182 252/502
2017/0050855 A1* 2/2017 Shankman ........... C10M 171/06

FOREIGN PATENT DOCUMENTS

CN 106868715 A 6/2017
WO WO 2008/143829 A2 11/2008

OTHER PUBLICATIONS

T. Nakamura et al., "Preparation of large-area reduced graphene oxide-smectite composite film and its electromagnetic shielding effectiveness," Clay Science18; Jan. 5, 2015; pp. 107-115.
Yue Jiang et al., "Versatile Graphene Oxide Putty-Like Material," *Advanced Materials*; 2016; pp. 10287-10292.
Chong Luo et al., A Cut-and-Paste Approach to 3D Graphene Oxide-based Architectures, *Advanced Materials*, 2018, pp. 1706229 (1-6).
Chi Cheng et al., "Solvated Graphenes: An Emerging Class of Functional Soft Materials," *Advanced Materials*, 2013, vol. 25; pp. 13-30. DOI: 10.1002/adma.201203567.
Huai-Ping Cong et al., "Graphene-based macroscopic assemblies and architectures: an emerging material system," Chem. Soc. Rev., Nov. 7, 2014, vol. 43; No. 21, pp. 7295-7325.
Cheng et al., "Self-Healing Graphene Oxide Based Functional Architectures Triggered by Moisture," Adv. Funct. Mater. 2017, vol. 27; pp. 1703096 (1-8).
Goki Eda et al., "Large-area ultrathin films of reduced graphene oxide as a transparent and flexible electronic material," Nature Nanotechnology, vol. 3, May 2007; pp. 270-274.
Peter Blake et al., "Graphene-Based Liquid Crystal Device," School of Computer Science, University of Manchester, Manchester, M13 9PL, UK; pp. 1-13.
Yihui Zhang et al., "Printing, folding and assembly methods for forming 3D mesostructures in advanced materials," Nature Reviews Materials, vol. 2, No. 4, Article No. 17019; Apr. 2017; pp. 1-17.
Sheng Xu et al., "Assembly of micro/nanomaterials into complex, three-dimensional architectures by compressive buckling," Science, vol. 347, Issue 6218, Jan. 9, 2015; pp. 154-159.
Niladri Patra et al., "Nanodroplet Activated and Guided Folding of Graphene Nanostructures," Nano Letters, vol. 9, No. 11, 2009; pp. 3766-3771.
Jiuke Mu et al., "Origami-inspired active graphene-based paper for programmable instant self-folding walking devices," Sci. Adv. 2015; 1:e1500533; Nov. 6, 2015; pp. 1-8.
Huhu Cheng et al., "Graphene Fibers with Predetermined Deformation as Moisture-Triggered Actuators and Robots," Angew. Chem. Int. Ed. 2013, vol. 52, pp. 10482-10486.

* cited by examiner

METHODS FOR RESHAPING AND BONDING GRAPHENE OXIDE-BASED ARCHITECTURES

CROSS-REFERENCE TO RELATED APPLICATIONS

The present application claims priority to U.S. Provisional Patent Application No. 62/621,870 that was filed Jan. 25, 2018, the entire contents of which are hereby incorporated by reference.

REFERENCE TO GOVERNMENT RIGHTS

This application is a National Stage of International Application No. PCT/US19/15071, filed Jan. 25, 2019, which claims the benefit of U.S. Patent Application No. 62/621,870, filed Jan. 25, 2018, the contents of which are herein incorporated by reference.

BACKGROUND

Techniques for forming three-dimensional (3D) architectures from flat sheets have attracted significant interest for creating new forms of electronics, biomedical, and energy devices. Taking inspiration from paper-crafting, one can identify three basic operations needed for creating 3D structures from properly cut sheets, which are folding, bending, and pasting. Folding tends to introduce local plastic deformation of the sheet, and the finished structure can maintain its shape freely. Both stochastic (e.g., crumpling) and deterministic (e.g., origami and kirigami) folding have been used to create functional material architectures from 2D precursors. Bending introduces local elastic deformation, and the resulting 3D structures are maintained under strain. This is reflected in the recent development of pop-up fabrication, which is capable of making extremely complex 3D architectures from tailor-cut sheets. (See, Y. Zhang, et al., *Nat. Rev. Mater.* 2017, 2, 17019; and S. Xu, et al., *Science* 2015, 347, 154.) Pasting joins separated pieces or different parts of the same sheet together, which is often a necessary step for making even very simple structures such as a box. Complementary to folding and bending, pasting is capable of creating new free-standing geometries that are fundamentally unattainable by folding and bending alone. However, pasting has been much less explored for 3D fabrication, presumably due to limited choices of readily weldable thin film materials or residue-free glues for maintaining the native material properties at the junction.

SUMMARY

Methods of reshaping and bonding graphene oxide-based structures are provided.

One embodiment of a method of reshaping a structure made from graphene oxide (GO) sheets includes: applying a force to the structure, wherein the force changes the shape of the structure from a first shape to a second shape; applying liquid water to the structure while it has the second shape; drying the structure; and removing the force, wherein the dried structure remains fixed in the second shape after the force is removed.

One embodiment of a method of bonding a first structure made from GO sheets to a second structure made of a co-dispersion of GO sheets and a particulate material includes: bringing the first structure and the second structure into contact in a contact area; applying liquid water to the contact area; and drying the contacting first and second structures, wherein the first and second structures are bonded together.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A shows that a fold line significantly weakens the GO paper (panel a2), due to extensive local damage (SEM, panel a3), which eventually fractures along the fold line, located in the center of the strip. After applying water, the folded area was flattened and became crack-free (SEM, panel a4), and the strength of the paper was largely recovered (panel a5). After a tensile test, the healed paper did not break at the fold line. FIG. 1B shows that a "laceration" in GO paper (SEM, panel b3) was healed after applying water, which partially dissolved nearby GO sheets to fill the gap (SEM, panel b4), leading to much restored strength (panel b2). FIG. 1C shows that two scissor-cut GO pieces were joined together by water to form a longer strip with comparable strength (panel c2), due to the formation of a continuous junction (panel c3). The glued strip did not break at the junction after a tensile test. FIG. 1D shows that stacks of 5 GO strips were glued to yield a thick film (panel d1). 3-point bending tests (panel d2) show that the final fused GO film was about 24 times stiffer than the unfused stacks, reflecting the high quality of the bonding between the 5 films, which is confirmed by the SEM observations (panel d3, d4).

FIG. 2A, panels a-c) show buckling/flattening of a GO strip upon applying/releasing in-plane compression. FIG. 2B, panels d-f, show that after exposure to a water mist for 30 sec and drying for another 30 min, the compressed/buckled strip maintained its shape without in-plane compression.

FIG. 3 depicts a cut-and-paste approach to GO architectures with extended dimensions and new geometries. (panel a) Circular GO paper was cut into 0.5 cm wide strips and then glued together by water to form a 1-meter-long ribbon (panel b), which was rolled up to form a free-standing (panel c) loose or (panel d) tight coil after water mist treatment. The GO strips were also glued together to yield complex 3D free-standing architectures such as (panel e) a Möbius strip, (panel f) a "crossroad sign" made of two out-of-plane crossed strips, (panel g) a helical coil, (panel h) a crisscross woven matt, and (panel i) a butterfly-shaped loop, in which sharp bending angles are highlighted with the circles.

FIG. 4 depicts an IR-transformable architecture assembled from pre-cut r-GO/GO strips: (panel a) The starting components, three r-GO/GO bilayer strips were assembled into (panel b) an H shape using water as glue. Drawings in insets illustrate the cross-sectional view of the junctions; (panel c) The two legs of the H were bent at different angles and fixed in the "push-up" pose by water mist; (panel d) Upon IR irradiation, bending of the strips transformed the structure to (panel e) a "sit up" pose, which returned to the (panel f) push-up pose after IR irradiation was turned off.

FIG. 7A shows stress-strain curves of a pristine and glued GO/CNT films, which are comparable to each other. The connected film did not break at the joint after a tensile test. FIG. 7B shows stress-strain curves of pristine and reconnected GO/VMT films, which are comparable to each other. The reconnected strip did not break at the joint after a tensile test.

FIG. 7 depicts that the ion channels in the GO cross are all interconnected. The I-V curves were measured through different combinations of the four arms of the cross structure of the GO, demonstrating that the ion channels were not blocked at the junction. The inset shows the geometry for measurement. The four reservoirs were filled with 1 mmol KCl solution.

DETAILED DESCRIPTION

Methods for reshaping and/or bonding GO sheet-containing structures using water are provided. Without intending to be bound to any particular theory of the inventions encompassed by this disclosure, it is proposed that the reshaping and bonding mechanisms can be attributed, at least in part, to the ability of stacked GO sheets to be loosened up and even re-dispersed in water and, upon drying, re-stacked to form solid structures. As a result, liquid water can be utilized to heal local damage, glue separated pieces, and release internal stress in GO sheet-containing structures to alter and fix their shapes. Complex and dynamic 3D GO architectures can thus be fabricated by a cut-and-paste approach. This approach also can be applied to GO sheet-containing hybrid structures.

The 3D GO architectures are useful in a variety of applications in which light weight, high strength, and self-destructing (e.g., water soluble) materials are desirably, including flying platforms (e.g., dandelion-mimic) for carrying sensors or other devices. Other applications include antennas for communication devices, where lightweight and complex geometry are needed.

The GO sheet-containing structures were composed of a plurality of stacked GO sheets and/or folded GO sheets and included structures such as GO films, GO fibers, and GO papers. As the name indicates, the GO sheets are oxidized graphene sheets. GO paper is a material composed of films of stacked GO sheets. Such papers are commonly formed from solutions of GO sheets by removing the water or other solvents present in the solution, allowing the GO sheets to dry into a free-standing, porous membrane. Although the papers can be quite thin, they typically have a micro-scale thickness of 1 µm or greater. For example, the GO papers can have a thickness in the range from about 5 µm to 100 µm. The GO sheets and the GO sheet-containing structures can be reduced to form corresponding graphene sheets and graphene sheet-containing structures. This is advantageous because it allows the GO-based structures to be converted into graphene structures, which may be used as an electrically conducting component in an electronic or mechanical devices, or as an antenna.

Some embodiments of the structures are constructed from GO films, including GO papers, that are composed of only GO sheets. Such GO films are free of polymers and dispersed particulate matter. In other embodiments, the GO sheet-containing structures are hybrid structures constructed from GO films that further include a particulate material co-dispersed with the GO sheets. For example, particles of a particulate material can be dispersed within the GO sheets, or the GO sheets can be dispersed with a particulate material, depending on which material is present in a greater amount by volume. Examples of particulate materials include clays and carbon nanoparticles, such as carbon nanotubes. The particles may have a variety of shapes. For example, the particles may be spherical, elongated (e.g., fibers, nanotube, and/or nanowires), or planar (e.g., sheets or flakes). The concentration of GO sheets in the hybrid structures should be high enough to allow for adequate bonding and/or reshaping of the structure via the application of water, as described herein. By way of illustration, in various embodiments the hybrid structures comprise at least 50 mass % GO sheets.

GO sheet-containing structures, including hybrid structures, can be bonded together by bringing a first GO sheet-containing structure into contact with a second GO sheet-containing structure and applying water to the contact area formed at the interface of the two structures. The contacting structures can then be dried to provide a single bonded structure. The bonding methods can be used to repair damage to a single piece of damaged GO material, in which case, the first and second GO sheet-containing structures can be pieces or portions of a larger structure, wherein the pieces or portions are separated by a cut or a tear. Alternatively, the bonding methods can be used to bond two or more different GO sheet-containing structures together, in which case, the two structures can have the same composition or a different composition.

GO sheet-containing structures, including hybrid structures, can be reshaped by applying an external force to a GO sheet-containing structure, wherein the force changes the initial shape of the structure to a new shape. For example, the force may introduce a fold, a bend, a twist, or a curve into a previously planar shape, such as a planar GO paper strip. The use of the term external indicates that the force that changes the initial shape of the structure is not the water itself—that is, the water does not induce the shape-change. While the external force is still acting on the GO sheet-containing structure, liquid water is applied to the structure and the structure is dried. When the force is removed, the GO sheet-containing structure retains the new shape. The stress created in the GO sheet-containing material by the external force would tend restore the material to its initial shape when the external force was removed. However, in the present methods, this stress is dissipated by the application of water.

The applied force can be, for example, a stretching force or a compressive force that introduces an internal stress in the GO sheet-containing structure. This stress can be dissipated by the water, allowing the structure to retain its new shape even after the initial force is removed. External forces include mechanical stress caused by the physical manipulation of the GO sheet-containing structure by human hands or machinery. In some embodiments of the methods, GO paper is initially reshaped by applying it around the external surface of a mold, such that the GO paper assumes the shape of the external surface of the mold in a stressed state. Water is then applied to GO paper to lock the GO paper into the shape of the mold once the GO paper has dried and the mold has been removed.

In the methods, the water is applied as a liquid. For example, the water can be applied as a spray or mist of droplets. Exposing the structures to humidity, which is water vapor, in the ambient atmosphere would thus not be considered applying water to the structures. Drying can be accomplished simply by allowing the water to evaporate under ambient conditions or by applying a vacuum and/or heat to expedite drying.

Example

This example demonstrates that water can help to heal several types of damage in GO thin films, release the stress in strained GO structures to reshape GO architectures, and act as a glue to create a diverse array of 3D architectures and dynamic structures using a cut-and-paste approach.

Figure 1A:
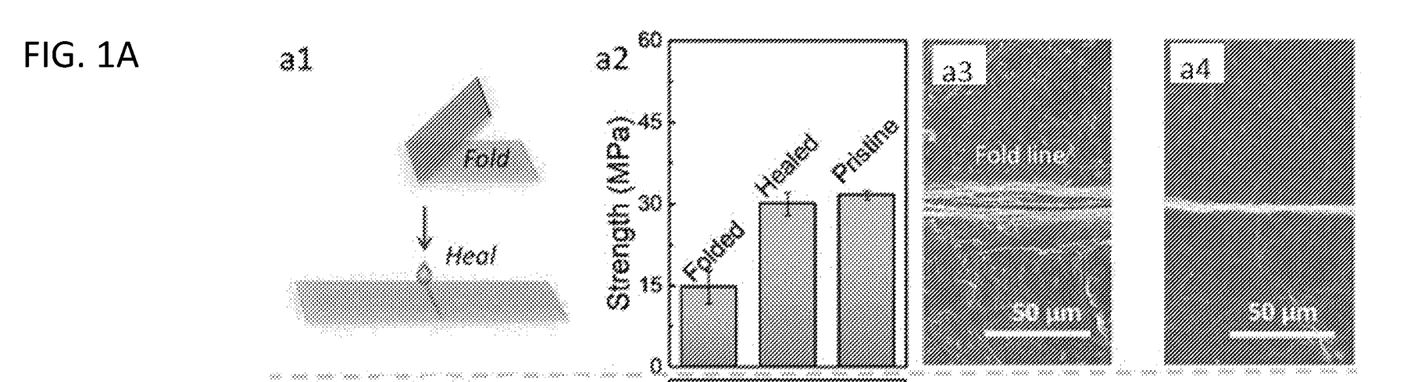
FIG. 1A-FIG. 1D depict that water can heal GO films damaged by (panel a1) folding and (panel b1) cutting, and even (panel c1) joining separated GO pieces together, as illustrated by the schematic drawings in the first column.
Figure 1B:
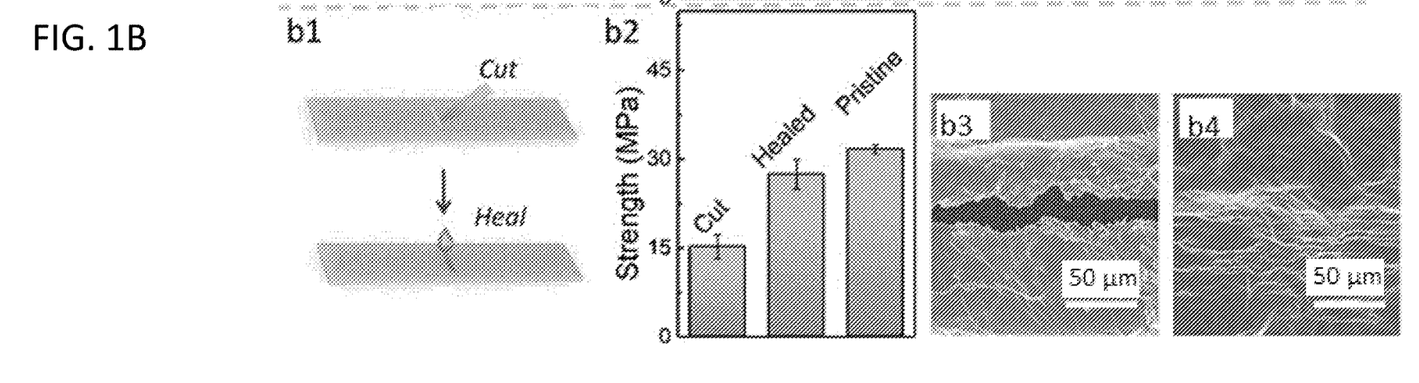
Figure 5:
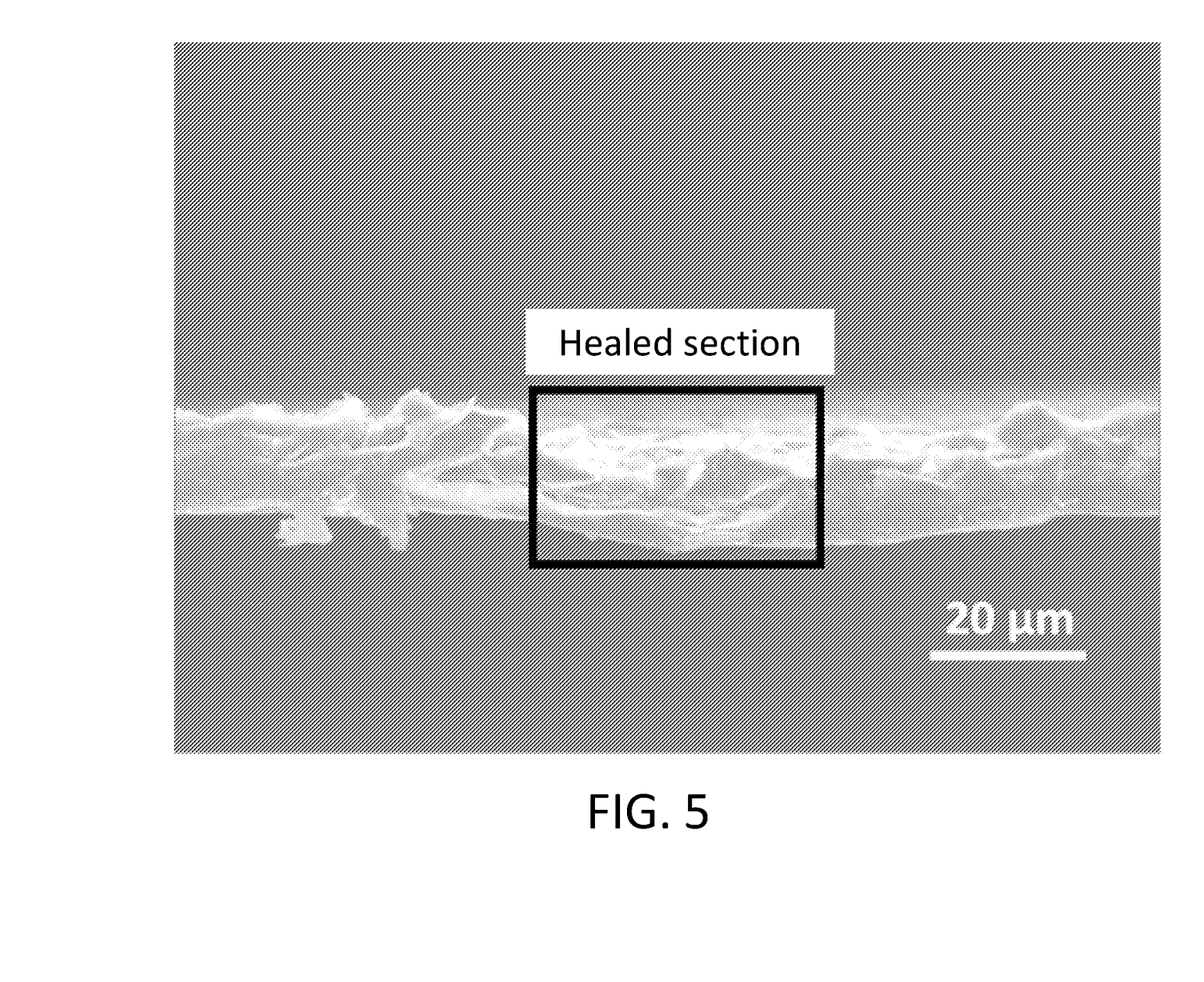
FIG. 5 depicts a cross-sectional SEM view of a healed cut in a GO film.

GO films were prepared by vacuum filtration of their aqueous dispersion using cellulose nitrate membranes. To avoid ionic contamination that crosslinks the GO sheets, the dispersion should be sufficiently washed to remove metal ion byproducts from the synthesis. The commonly used anodized aluminum oxide (AAO) filter disk should be avoided to prevent contamination by $Al^{3+}$. FIG. 1A-FIG. 1D illustrate that water can help to heal damage in GO paper caused by folding and cutting, and even glue separated pieces together. For example, a fold line in a GO paper became its stress concentrator and significantly lowered its strength due to extensive local damage (FIG. 1A, panels a1-a3). Applying a drop of water along the fold line triggered the reorganization of GO sheets in the damaged area, bridging the cracks and flattening the folded area within a minute, leading to largely recovered strength of the paper (FIG. 1A, panel a4). Folded GO papers tended to break at the fold line, while the water healed ones did not, suggesting that the structural damage had been repaired. FIG. 1B shows a GO film with a more severe laceration type of damage. The cut, which was about 20 μm wide, was a stress concentrator, leading to over 50% reduction in strength (FIG. 1B, panels b 1-b3). Applying a drop of water over the cut re-connected it with dissolved GO sheets from the surrounding area within a minute (FIG. 1B, panel b4 and cross-sectional SEM image in FIG. 5). Although the reconnected part was thinner than the original film, the strength of the healed GO paper was restored to around 90% of its initial value. Cuts of other shapes, such as circular holes punched by a needle can also be healed (e.g., patched) by water.

Figure 1C:
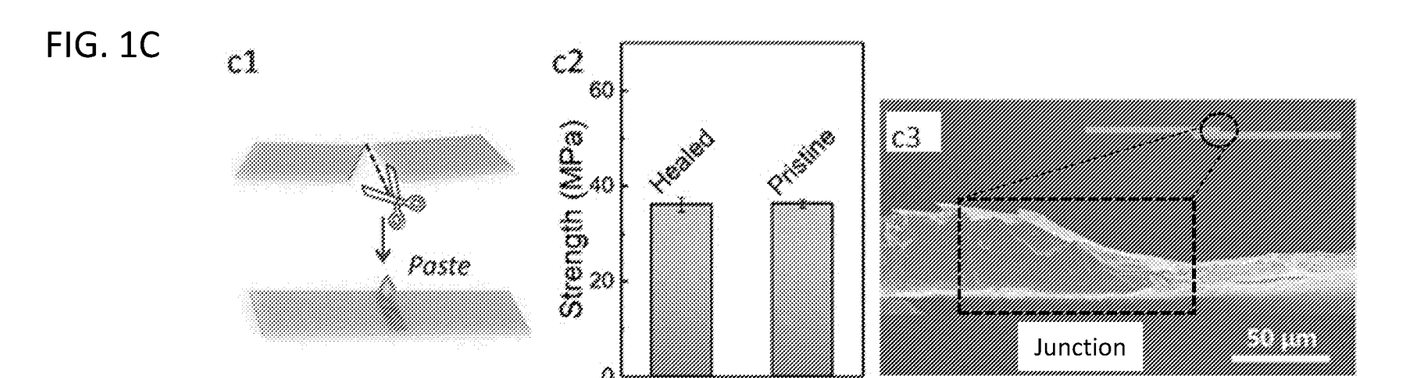

In FIG. 1C, two separated GO pieces are shown to be pasted together with a drop of water as glue to form a long strip. The glued area was around 1-2 mm to ensure sufficient contact at the joint. The two strips were fused together within a minute and further dried for about an hour before a tensile test. The strength of the new long strip was found to be comparable to that of a pristine GO paper, and it did not break at the joint (FIG. 1C, panels c1-c2). This was due to the formation of a continuous GO junction at the water treated area, which is confirmed by SEM (FIG. 1C, panel c3). A similar healing effect was also observed for thicker (100 μm) GO papers.

Figure 1D:
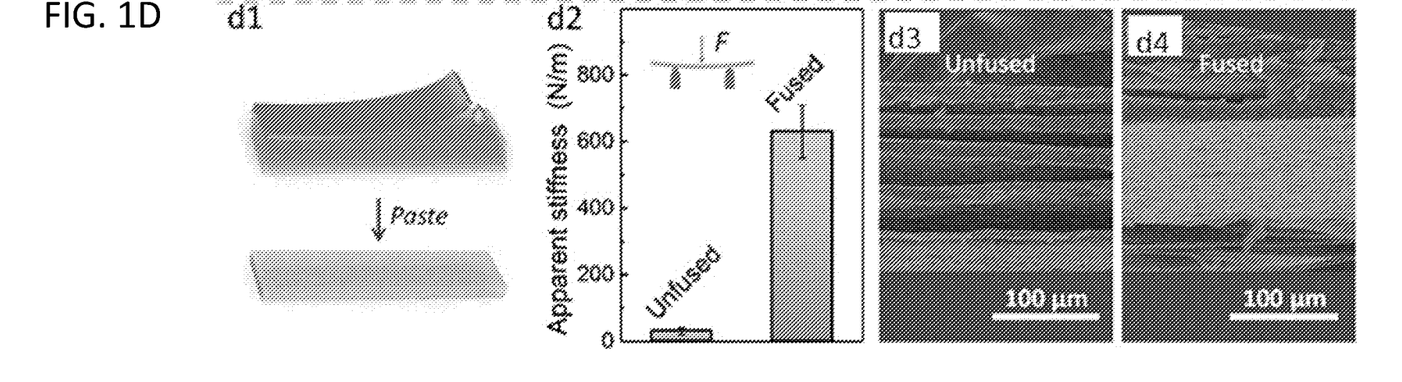

On the other hand, pasting is a very effective way to make thick GO films, which are very difficult to make by filtration. For example, making a 100 μm-thick GO films by filtration could take hundreds of hours. However, this can be readily achieved in minutes by gluing a few thinner ones together (FIG. 1D, panel d1). An example is shown in FIG. 1D, where 5 stacked GO strips were glued together by water to yield a thick film. The high quality of bonding between the 5 strips is reflected in the drastically increased bending stiffness of the final film. Based on solid mechanics, the bending stiffness of stacked n layer films scales with n, if there is no interlayer bonding or friction, but $n^3$ for perfect bonding between layers. Using 3-point bending tests, the stiffness of 5 stacked GO films was compared with and without being glued by water, and it was found that the glued one was about 24 times stiffer (FIG. 1D, panel d2). This is strong evidence supporting the high quality of the junctions glued by water, which is also confirmed by SEM observation of their cross-sections (FIG. 1D, panels d3 and d4).

Figure 6A:
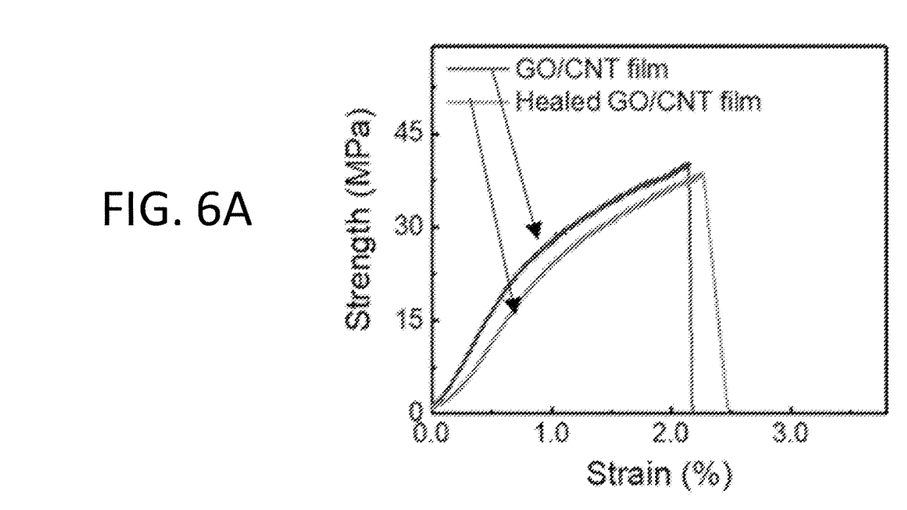
FIG. 6A and FIG. 6B depict that GO based hybrid papers can be glued together with restored mechanical properties.
Figure 6B:
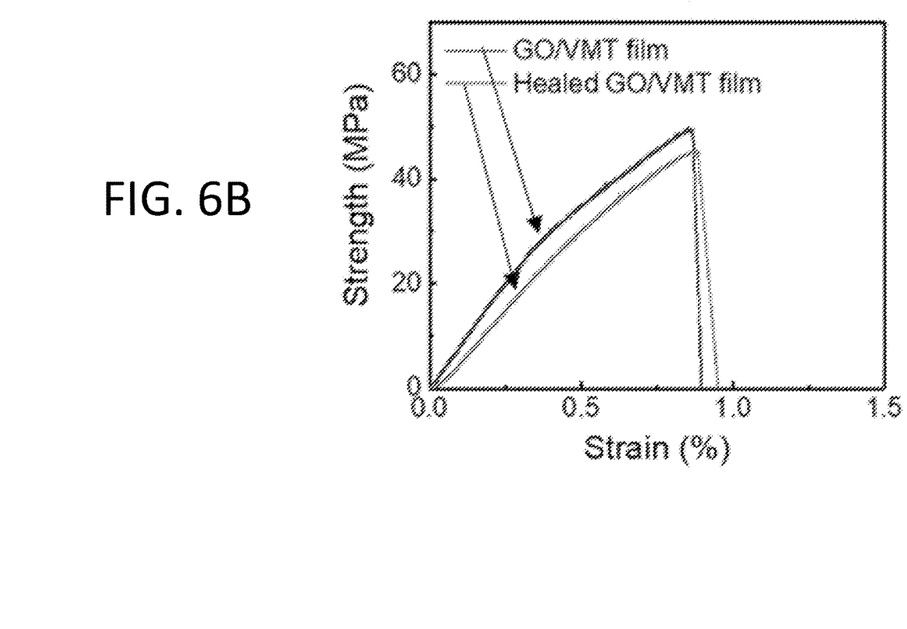

GO can be readily co-dispersed with other soluble materials, such as clay sheets in water. It can also be used as dispersing agents to process insoluble materials, such as carbon nanotubes in water. (See, J. Kim, et al., *J. Am. Chem. Soc.* 2010, 132, 8180.) These co-dispersions can readily yield GO-based hybrid thin films after filtration or casting. Hybrid thin films of GO/vermiculite and GO/carbon nanotubes were also found to exhibit similar healing behaviors using water. They can be glued together by water to form a longer strip with comparable mechanical properties (FIG. 6A and FIG. 6B). Even strips of different material compositions can be connected together by water.

Figure 2A:
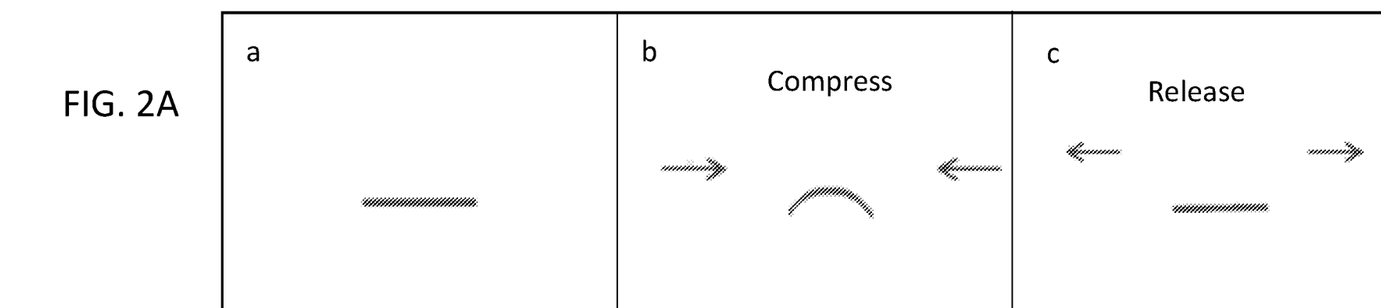
FIG. 2A-FIG. 2B depict that water can dissipate the stress in strained GO shapes and make them free-standing.
Figure 2B:
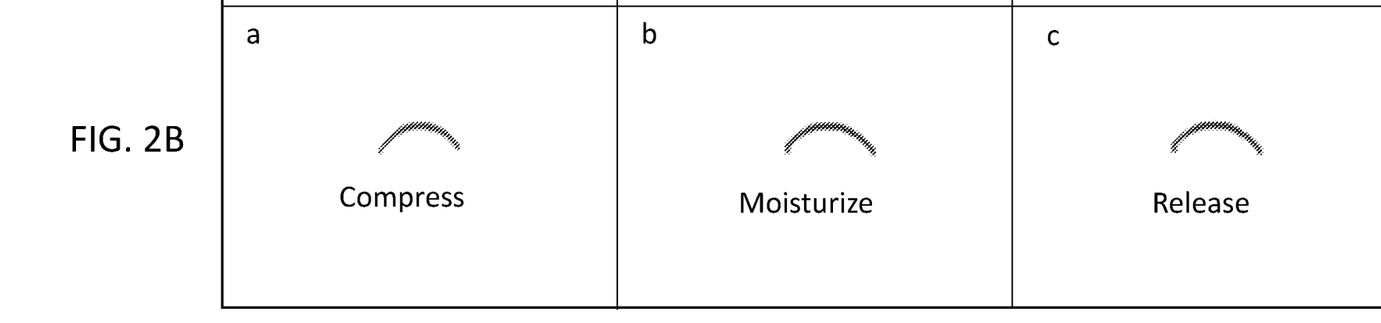

Besides the healing effect, water also can be utilized to fix GO paper in various strained shapes by dissipating stress. As illustrated in FIG. 2A, panels a-c, a flat GO strip under in-plane compression buckled and then returned to flat state when the stress was removed. The buckled state was strained and needed to be maintained by stress. However, after the buckled GO strip was exposed to water mist applied through a handheld ultrasonic nebulizer (FIG. 2B, panel b), the shape was retained even after removing the in-plane compression (FIG. 2B, panel c). Upon hydration, GO sheets in the bent GO strip slid against each other and reorganized in response to the stress, effectively dissipating it and fixing the buckled shape of GO.

Figure 3:
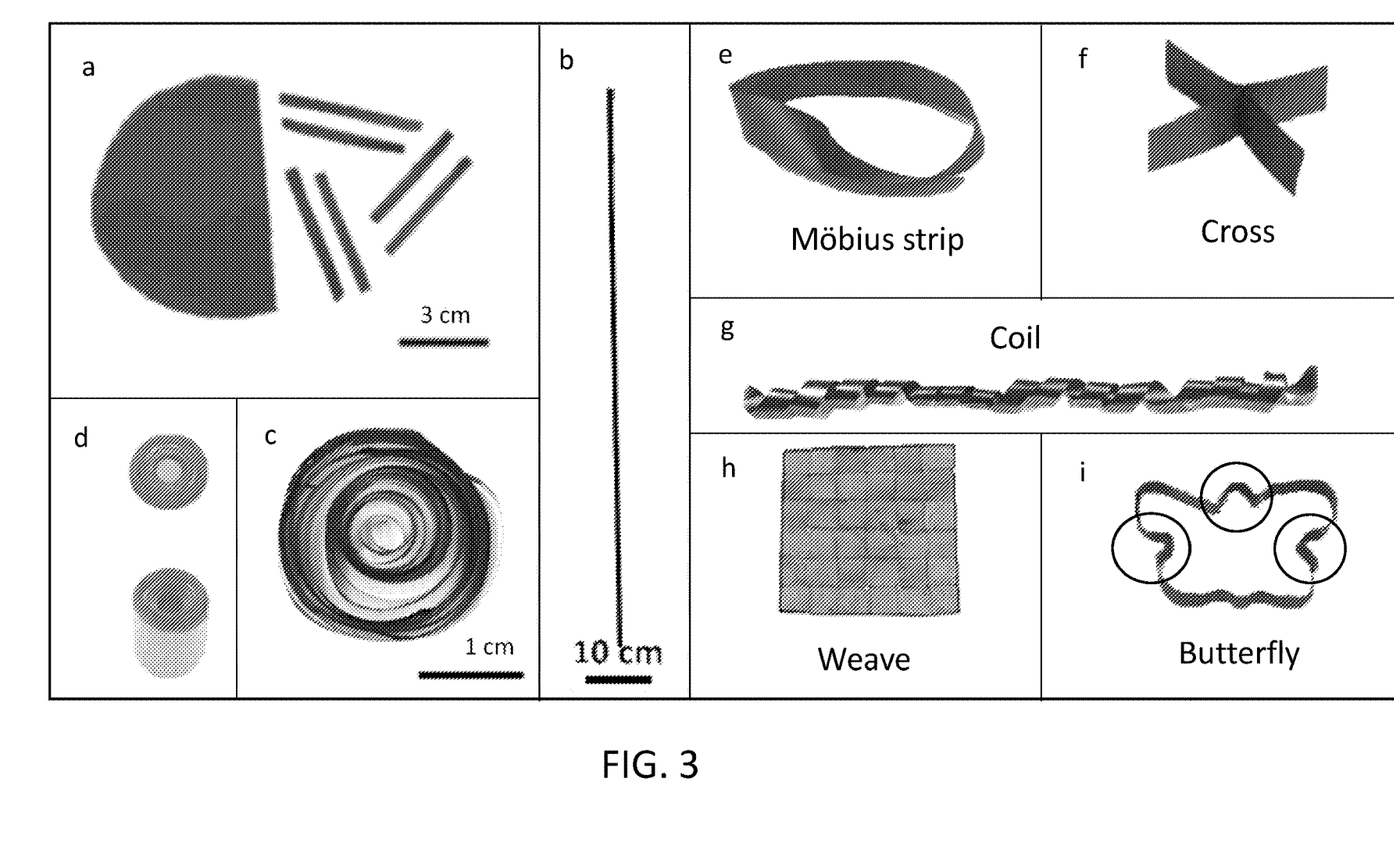

Results in FIG. 1A-FIG. 1D and FIG. 2A and FIG. 2B show that water can heal damage, make connections, and release stress in GO paper. Therefore, a cut-and-paste approach can be used to make complex GO architectures that cannot be easily made by other means such as origami or pop-up. FIG. 3, panels a-b, shows that circular GO papers of 7.5 cm in diameter were sliced into many 0.5 cm wide thin strips, which were then re-connected to a continuous 1-meter-long ribbon. This exemplifies the capability of the cut-and-paste approach to transform existing GO structures into new geometries with extreme dimensions. The GO ribbon was rolled up and fixed in a loose coil shape by the mist treatment (FIG. 3, panel c). It was also tightly rolled up to form a cylinder when its end was fixed by water (FIG. 3, panel d). Such a GO cylinder had a large cross-sectional area with GO sheets aligned along the vertical orientation, which could be useful for molecular separation and energy storage applications.

Figure 7:
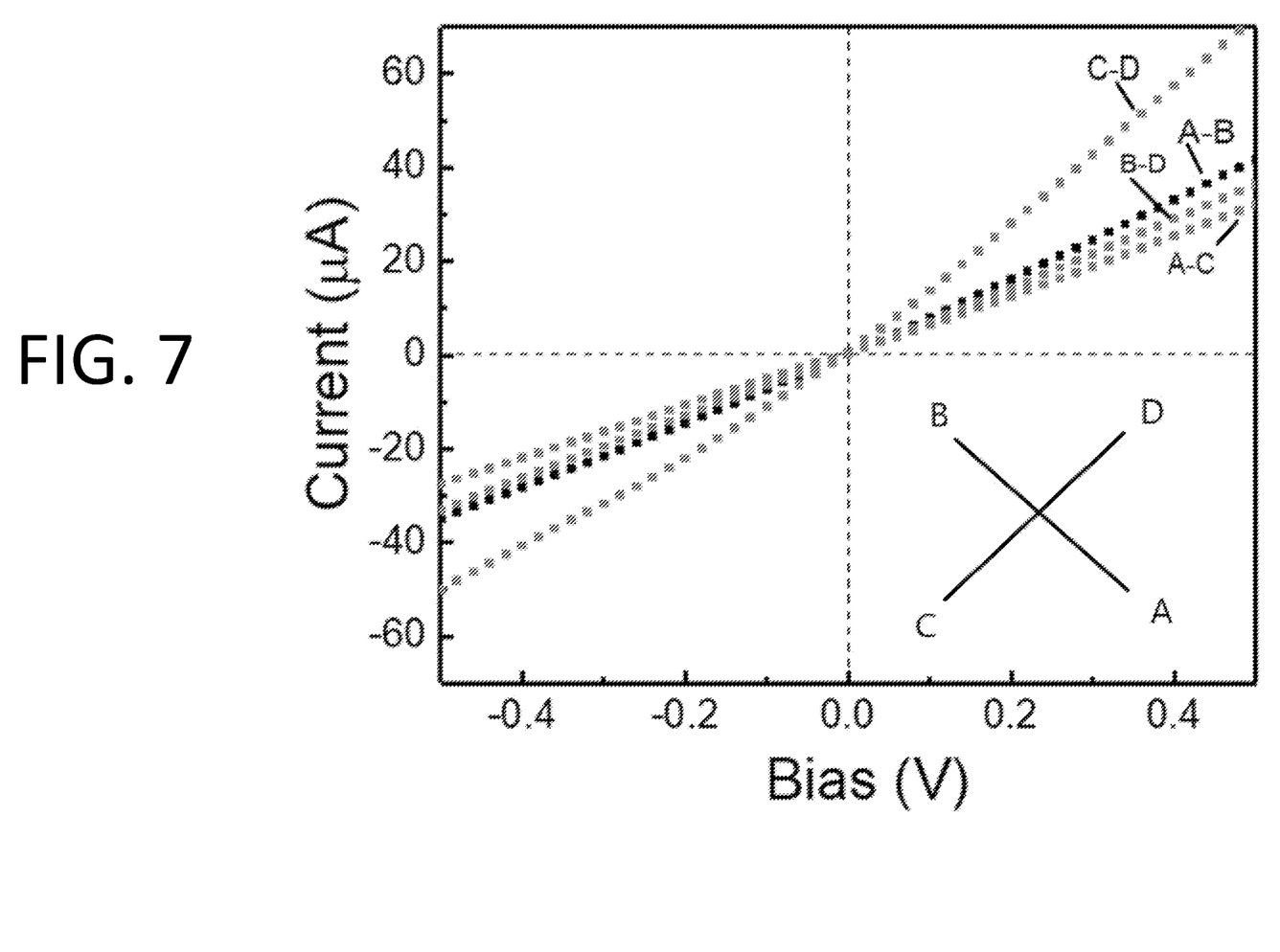

FIG. 3, panels e-i, shows a number of additional 3D shapes. A Möbius strip is a one-sided nonorientable surface (FIG. 3, panel e), which was prepared by water-gluing the two ends of a twisted GO strip. An out-of-plane GO cross, resembling the shape of a crossroad sign, is shown in FIG. 3, panel f, which was made by pasting two GO strips that were half cut in the center. The two GO strips intersected each other by a line, and the ion channels (i.e., the interlayer spacing) in the four arms were found to be all interconnected (see ionic I-V curves in FIG. 7). Such a structure could be useful for studying how solvents or ions flowing along one direction affect the ionic or molecular transport in the orthogonal direction (e.g., molecular/ionic gating). FIG. 3, panel g, shows a helical GO coil made by winding a long ribbon on a cylinder, followed by water mist treatment to fix the shape. The helical coil was stable, flexible and elastic. FIG. 3, panel h, shows a criss-cross woven pattern made of GO strips. The overlapping areas of the strips were glued together by water to strengthen the structure. Such a structure represents a new strategy to create multilayer GO and graphene based laminates with new mechanical properties. FIG. 3, panel i, shows a GO loop in a butterfly shape made by pasting a ribbon along the wetted periphery of a household cookie cutter, followed by drying. The butterfly shape was chosen to illustrate a complex shape with a number of sharp bending angles (highlighted by circles) that cannot be maintained by bending. A free-standing structure with this shape again highlights the stress-release capability of the fabrication approach, which broadens the scope of paper-based 3D fabrication techniques.

Figure 4:
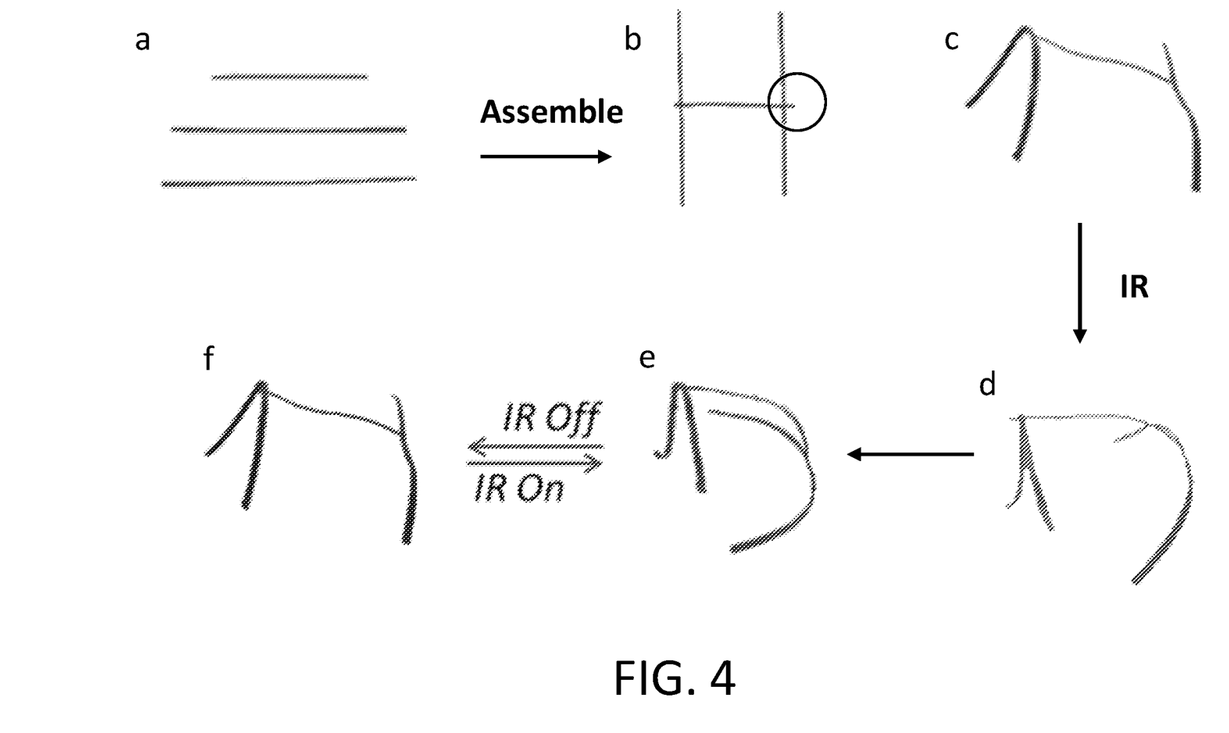
Figure 8:
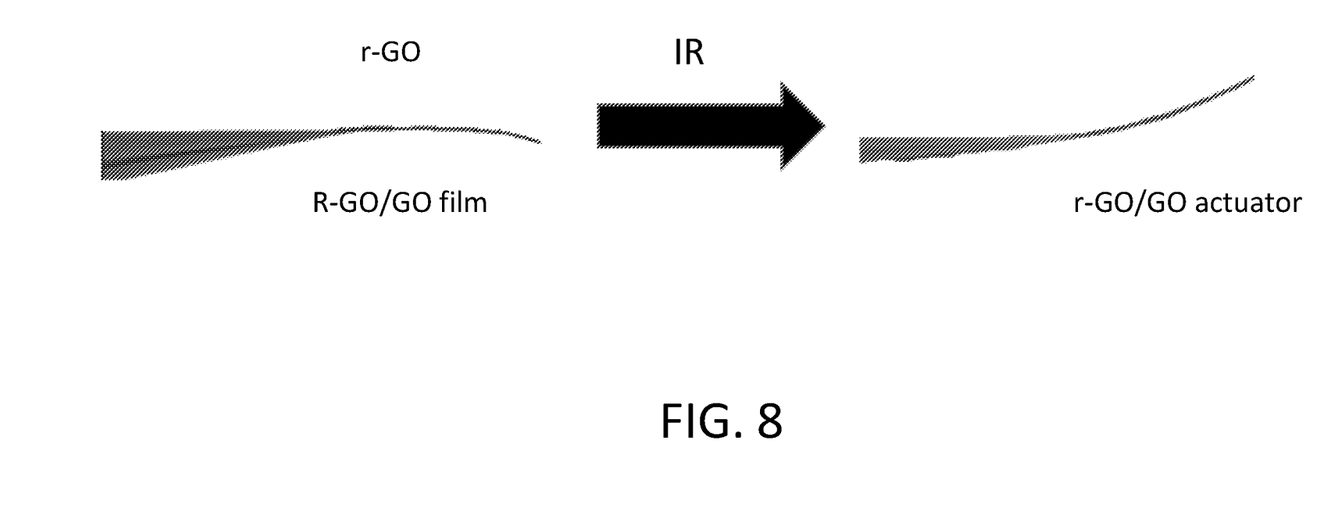
FIG. 8 depicts an image showing IR actuated bending of an r-GO/GO bilayer.

Pre-cut GO pieces were pasted together to construct functional 3D structures that can dynamically transform under IR. The basic strut of these structures was an r-GO/GO bilayer strip (FIG. 4, panel a), which was sliced from a large bilayer paper made by brushing HI solution on one side of the GO film to reduce it to r-GO. (See, S. Pei, et al., Carbon 2010, 48, 4466.) A flat r-GO/GO strip (30 mm×4 mm×22 μm) can bend upon the irradiation of infrared (IR) light, curving to nearly 40° within 2 s (FIG. 8), and rapidly unbend after the IR light is turned off. The mechanism of such responses is attributed to different degrees of water absorption/desorption in the two layers. (See, J. Mu, et al., Sci. Adv. 2015, 1, e1500533; and H. Cheng, et al., Angew. Chem. Int. Ed. 2013, 52, 10482.) Upon IR heating, the hygroscopic GO layer can release water and shrink, and reabsorb water from the environment to expand upon cooling. However, the r-GO layer is non-hygroscopic and does not show such a photothermal response. This asymmetric photothermal response makes the bilayer bend towards the GO side upon exposure to IR. The bilayer struts are then assembled into predetermined structures. An example is shown in FIG. 4, panels a-b, where three bilayer strips were assembled into an H-shape. Next, the two legs in the H were bent by hand into different angles and fixed by a water mist (FIG. 4, panel c). This deformed the planar H into a partially standing "push-up" pose. Upon IR irradiation, it transformed into a "sitting puppy" pose (FIG. 4, panel d) in seconds. When IR was turned off, the "puppy" transformed from "sit-up" back to the "push-up" pose. The two poses can be reversibly transformed many times, as long as there is sufficient moisture around the structure to allow rehydration of the GO layer. Besides the structure shown in FIG. 4, panel a number of other IR transformable structures were demonstrated, including a five-branch structure that can stand up and lay flat and another five-branch standing structure that can rotate. All of these structures were assembled by the cut-and-paste approach, and their motions were adjusted by the length, bending angle, and relative orientations of the constituting strips.

Experimental Section

Preparation of GO films: GO was prepared using a modified Hummers' method and purified by two-step washing to remove ionic byproducts. (See, J. Luo, et al., Acc. Chem. Res. 2013, 46, 2225; F. Kim, et al., Adv. Funct. Mater. 2010, 20, 2867; and W. S. Hummers, et al., J. Am. Chem. Soc. 1958, 80, 1339.) Stock dispersions of GO (10 mg/ml) were used to make GO papers either by filtration through cellulose nitrate membranes or by casting on glass petri dishes and dried in air for 48 h. The thickness of these GO films was about 20-30 μm based on SEM observation. During filtration, filter disks made of anodized aluminum oxide should not be used to avoid contamination by $Al^{3+}$ ions. (See, C.-N. Yeh, et al., Nat. Chem. 2015, 7, 166.)

Healing of damaged GO films (FIG. 1A-FIG. 1D): GO strips (20 mm×4 mm) were used for all the experiments here. An unrecoverable fold line was generated by repeatedly folding the GO strip at the same position 5 times. Another strip with a 2 mm long "laceration" was made by cutting the film with a surgical blade. Healing was done by spreading a small drop of water (c.a., 10 μl) on the damaged area and allowing it to dry in air, which usually took less than 1 minute. Similarly, two scissor-cut GO strips were glued together by water with about 2 mm overlap. The two strips were connected within 1 minute after drying, and the new long strip was left in air to dry for another hour before a tensile test was performed.

Figure 9:
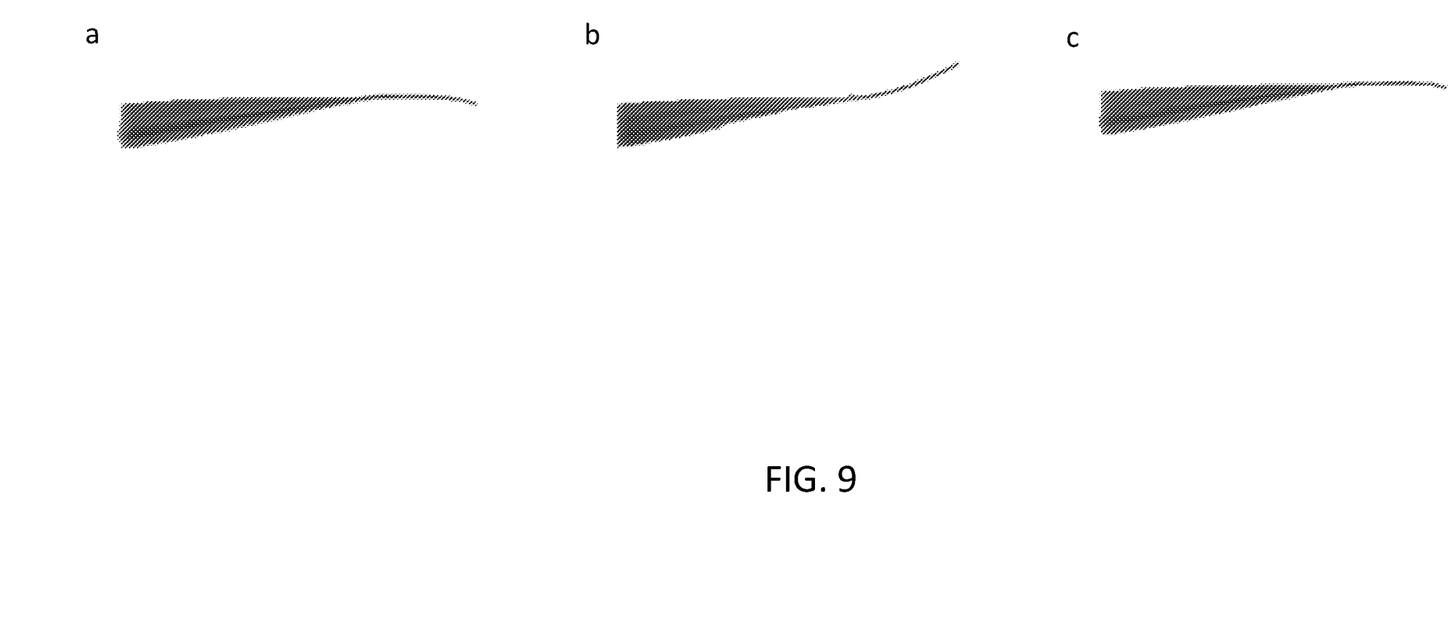
FIG. 9 depicts IR-induced reversible bending of an r-GO/GO double-layer film.

IR transformable architectures (FIG. 4 and FIG. 9): The r-GO/GO double-layer film was fabricated by brushing HI solution (57 wt %) on one side of the GO film. This resulted in an asymmetric r-GO/GO bilayer after drying. The bilayer film was sliced into thin strips, which were then used as the strut for building transformable architectures. IR irradiation was applied using a commercial infrared light source (Exo Terra, 100 W) from a distance of about 10 cm.

Characterization: SEM images were obtained on a Hitachi S-4800 SEM microscope. Tensile tests of GO films were performed using a dynamic mechanical analyzer (EltroForce 5500, BOSE). Ionic conductance measurements were done based on a previously reported procedure, in a geometry shown in FIG. 7, inset. (See, K. Raidongia, et al., J. Am. Chem. Soc. 2012, 134, 16528.) The GO structure was embedded in PDMS. Reservoirs were carved in the PDMS to expose each of the 4 arms of GO paper to 1 mmol of KCl solution. The device was soaked in KCl overnight before conductance measurements were taken, using Ag/AgCl as the electrodes.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of reshaping a structure comprising graphene oxide sheets, the method comprising:
  applying an external force to the structure, wherein the external force changes the shape of the structure from a first shape to a second shape;

applying water to the structure while it has the second shape;

drying the structure; and removing the external force, wherein the dried structure remains fixed in the second shape after the external force is removed.

2. The method of claim 1, wherein the external force applied to the structure is a compressive force or a stretching force.

3. The method of claim 1, wherein the structure comprising graphene oxide sheets is a graphene oxide paper.

4. The method of claim 3, wherein the graphene oxide paper consists only of graphene oxide sheets.

5. The method of claim 3, wherein the graphene oxide paper comprises particulate material dispersed within graphene oxide sheets.

6. The method of claim 1, wherein the external force changes the shape of the structure from a planar shape to a non-planar shape.

7. The method of claim 1, wherein changing the shape of the structure comprises bending the structure, coiling the structure, folding the structure, or a combination thereof.

8. The method of claim 1, wherein the structure comprising graphene oxide sheets is a strip of graphene oxide paper and the step of applying an external force to the structure, wherein the external force changes the shape of the structure from a first shape to a second shape, comprises applying the graphene oxide paper around a mold such that the graphene oxide paper conforms to the shape of the mold.

9. The method of claim 1, further comprising bonding the structure to a second structure comprising graphene oxide sheets by applying water to an interface between the structure and the second structure and drying the interface.

10. The method of claim 1, further comprising reducing the graphene oxide sheets to convert them into graphene sheets.

11. The method of claim 1, wherein the second shape is not dependents on the relative humidity.

12. The method of claim 1, wherein the second shape is the shape of an antenna.

13. A method of bonding a first structure comprising graphene oxide sheets to a second structure comprising a co-dispersion of graphene oxide sheets and a particulate material, wherein the first structure is free of dispersed particulate material or comprises a co-dispersion of the graphene oxide sheets and a particulate material that is different from the particulate material of the second structure, the method comprising:

bringing the first structure and the second structure into contact in a contact area;

applying liquid water to the contact area; and drying the first and second structures, whereby the first and second structures are bonded together.

14. The method of claim 13, wherein the first structure comprises the co-dispersion of the graphene oxide sheets and the particulate material.

15. The method of claim 13, wherein the particulate material of the second structure comprises a clay.

16. The method of claim 13, wherein the particulate material of the second structure comprises carbon nanotubes.

* * * * *